United States Patent [19]

Kasson et al.

[11] 4,061,887
[45] Dec. 6, 1977

[54] KEY TELEPHONE ADAPTER FOR ELECTRONIC TELEPHONE SWITCHING SYSTEM

[75] Inventors: James M. Kasson, San Mateo; Samuel F. Wood, Los Altos Hills, both of Calif.

[73] Assignee: Rolm Corporation, Cupertino, Calif.

[21] Appl. No.: 679,632

[22] Filed: Apr. 23, 1976

[51] Int. Cl.$^2$ ............................................. H04M 1/00
[52] U.S. Cl. ..................................... 179/99; 179/18 J
[58] Field of Search ...................... 179/99, 18 J, 18 F, 179/18 FA

[56] References Cited

U.S. PATENT DOCUMENTS

| | | | |
|---|---|---|---|
| 3,604,857 | 9/1971 | Opferman | 179/99 |
| 3,749,848 | 7/1973 | Knollman et al. | 179/99 |
| 3,843,845 | 10/1974 | Ridley | 179/99 |
| 3,935,396 | 1/1976 | Barsellotti et al. | 178/99 |
| 3,973,085 | 8/1976 | Shiff | 179/99 |

*Primary Examiner*—William C. Cooper
*Assistant Examiner*—Gerald L. Brigance
*Attorney, Agent, or Firm*—Townsend and Townsend

[57] ABSTRACT

A key telephone adapter unit providing interconnection between a key telephone instrument having a line selector unit with a plurality of lines and a corresponding plurality of line status indicators and an electronic telephone switching system in which audio frequency voice information signals and supervisorial serial data signals are interfaced to individual telepone handsets by first and second conductor pairs.

The adapter unit responds to a serial data polling command received from the switching system over the data pair by converting signals representative of the status of each line of the associated key telephone instrument to serial data signals for transfer to the switching system over the data pair; and responds to other serial data commands received from the switching system over the data pair by generating command signals for directing operation of the line status indicators, e.g. the status lamps, the bell and the buzzer.

2 Claims, 14 Drawing Figures

_Fig_1

_Fig_2

KEY TELEPHONE ADAPTER FOR ELECTRONIC TELEPHONE SWITCHING SYSTEM

BACKGROUND OF THE INVENTION

This invention relates to the field of telephone signal processing. More particularly, this invention relates to method and apparatus for intercoupling a key telephone instrument with an electronic private branch exchange.

Telephone instruments are known which are provided with the capability of handling incoming or outgoing calls on a plurality of voice frequency lines. Such telephone instruments, generically termed key telephone instruments (e.g. a key telephone handset or a desk top unit marketed under the Trade Mark CALL DIRECTOR™ are typically provided with a line selector unit comprising a plurality of manually operable line push button switches which enable the operator to select one of the plurality of lines for active operation. The line selector unit also includes a hold push button switch which the operator may depress to place a call on hold. Such telephone instruments are also typically provided with line status indicators, such as a plurality of incandescent lamps which indicate by illumination which of the plurality of lines is active, a ringing circuit including a bell for indicating an incoming call from an outside line (ring), and optionally a buzzer for indicating an incoming call on an intercom line (buzz).

In the past, in order to enable proper functional operation of a key telephone instrument, three pairs of conductors (i.e. six conductors) have been required for each line in a key telephone or call director. For a key telephone having a six line capability, for example, 36 individual conductors have been required, each of which must be connected to the master bus carrying the individual subscriber lines in the branch exchange. Due to the relatively large number of conductors required, it is economically undesirable to provide more than a few key telephone instrument outlets in an office when the private branch exchange wiring system is being installed. Thus, the sites for key telephone handsets and call directors must be preselected in advance and cannot be changed without extensive rewiring or replacement of the master bus, both of which are undesirable limitations.

Due to recent developments in the field of electronic telephone switching systems, it is now possible to provide a fully electronic private branch exchange in which each key telephone instrument is tied into the system by means of a conventional voice conductor pair over which the audio frequency voice information is conducted and a serial data conductor pair over which supervisorial serial data signals are conducted.

SUMMARY OF THE INVENTION

The invention comprises an apparatus for enabling a conventional key telephone instrument to be intercoupled to an electronic branch exchange utilizing supervisory signals generated in a serial data format. The invention responds to receipt of a predetermined polling command supplied from the electronic branch exchange via a pair of data signal conductors by converting signals representative of the status of each line of a line selector unit of a multiline key telephone instrument to serial data signals for transfer to the electronic branch exchange via the data signal conductor pair. The invention responds to receipt of command signals from the electronic branch exchange by converting the serial command signals to appropriate individual command signals for directing the operation of the line status indicators in the key telephone instrument.

In the preferred embodiment, the apparatus comprises input/output port means adapted to be coupled to the electronic branch exchange via the serial data pair; input terminal means adapted to be coupled to the line selector unit of the key telephone instrument; output terminal means adapted to be coupled to the line status indicators of the key telephone unit; converting means having a serial data port coupled to the input/output port means, a parallel data input terminal means and a parallel data output terminal means, the converting means including means for converting serial data signals input thereto to a parallel data signal format and means for converting parallel data signals input thereto to a serial data signal format; encoder means coupled to the input terminal means and the converting means for furnishing the line selector unit signals to the parallel data input terminal of the converting means; decoder means coupled to the output terminal means and the parallel data output terminal means of the converting means for furnishing the line status indicator command signals to the output terminal means; and control means responsive to receipt from the associated electronic branch exchange of the special polling command for enabling the converting means to generate the serial data signals from the line selector unit signals and for enabling these serial data signals to be coupled to the input/output port means, and responsive to receipt of the serial data command signals from the associated electronic branch exchange for enabling the converting means to generate the parallel data signals from the incoming serial data signals and for enabling the decoding means to couple the command signals to the output terminal means.

The decoder means includes a ringing command decoder/driver unit which is selectively responsive to a first group of the data command signals for generating a first group of line status indicator command signals, and a lamp command decoder/driver unit selectively responsive to a second group of the data command signals for generating a second group of line status indicator command signals. The ringing command decoder/driver unit comprises a ringing command decoder, and a ringing circuit coupled to the ringing logic circuit. Optionally, the invention includes a buzzer logic circuit coupled to the ringing command decoder and a buzzer driver circuit coupled to the buzzer logic circuit.

The lamp command decoder/driver unit includes a plurality of lamp driver circuits corresponding in number to the maximum number of indicator lamps in the key telephone instrument, means for storing data command signals from the second group of data command signals in an ordered sequence, with each stored command signal being associated with a different one of the lamp driver circuits, and means for sequentially enabling the plurality of lamp driver circuits in accordance with the corresponding lamp command signals.

The preferred embodiment further includes timing means for generating a plurality of periodic wave trains of different frequencies for providing modulating signals for the ringing driver circuit, the buzzer driver circuit and the lamp driver circuits.

The encoder means includes a status change detector means for generating a control signal which conditions the control means whenever the line selector unit signals are altered indicating the change in line selector unit push button configuration.

For a fuller understanding of the nature and advantages of the invention, reference should be had to the ensuing detailed description taken in conjunction with the accompanying drawings.

BRIEF DESCRIPTION OF THE DRAWINGS

FIGS. 5A–5E are detailed schematic diagrams of portions of the preferred embodiment;

FIG. 5F is a chart showing the manner in which FIGS. 5A–5E are inter-related;

DESCRIPTION OF THE PREFERRED EMBODIMENT

Figure 1:
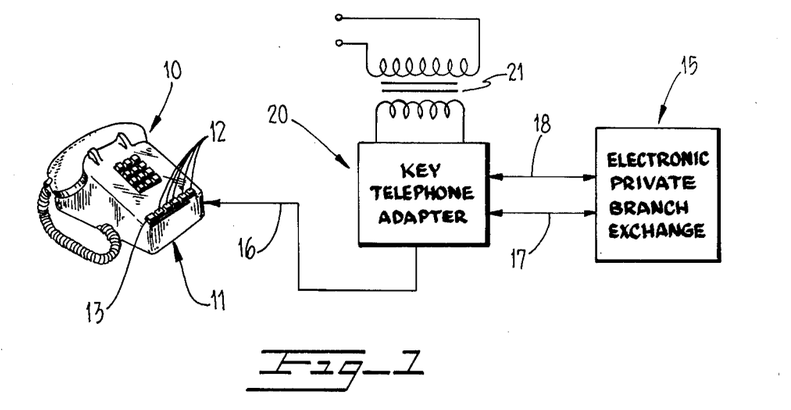
FIG. 1 is a schematic diagram illustrating the use of the invention.

Turning now to the drawings, FIG. 1 is a schematic diagram illustrating use of the invention. With reference to this Fig., a key telephone instrument 10 has a line selector unit generally designated by reference numeral 11 which includes a plurality of manually operable pushbutton switches 12 serving to identify an activated line and a hold button 13 for enabling a call on an activated line to be placed on hold.

Key telephone instrument 10 is further provided with conventional line status indicators, e.g. indicator lamps (not shown but typically received within switches 12) each associated to a different one of the pushbutton switches 12 and capable of being illuminated whenever the associated line is active; a bell (not shown but typically housed within instrument 10) for audibly indicating an incoming call from an outside line; and a buzzer (also housed within instrument 10) for indicating an incoming intercom call. Since key telephone instrument 10 is a conventional commercially available unit, further details thereof are hereby omitted to avoid prolixity.

Key telephone instrument 10 is coupled to an electronic branch exchange generally designated by reference numeral 15 by means of a key telephone adapter circuit 20 constructed according to the invention and illustrated in FIGS. 2, 3 and 5A–5E. The key telephone instrument 10 is coupled to key telephone adapter circuit 20 by means of a multiconductor cable 16, while electronic branch exchange 15 is coupled to key telephone adapter 20 by means of a first pair of conductors 17, designated the data pair, and a second pair of conductors 18, designated the voice frequency pair. Conductors 17 carry the serial data signals having the format specified hereinbelow between electronic branch exchange 15 and key telephone adapter circuit 20, while conductors 18 carry the voice frequency information between electronic branch exchange 15 and key telephone instrument 10.

Key telephone adapter circuit 20 is powered by means of a step down transformer 21 which supplies a low voltage alternating current (e.g. 24 VAC) to a power supply internal to key telephone adapter circuit 20 from a source of conventional alternating current voltage (e.g. 117 VAC) local to key telephone instrument 10.

Figure 2:
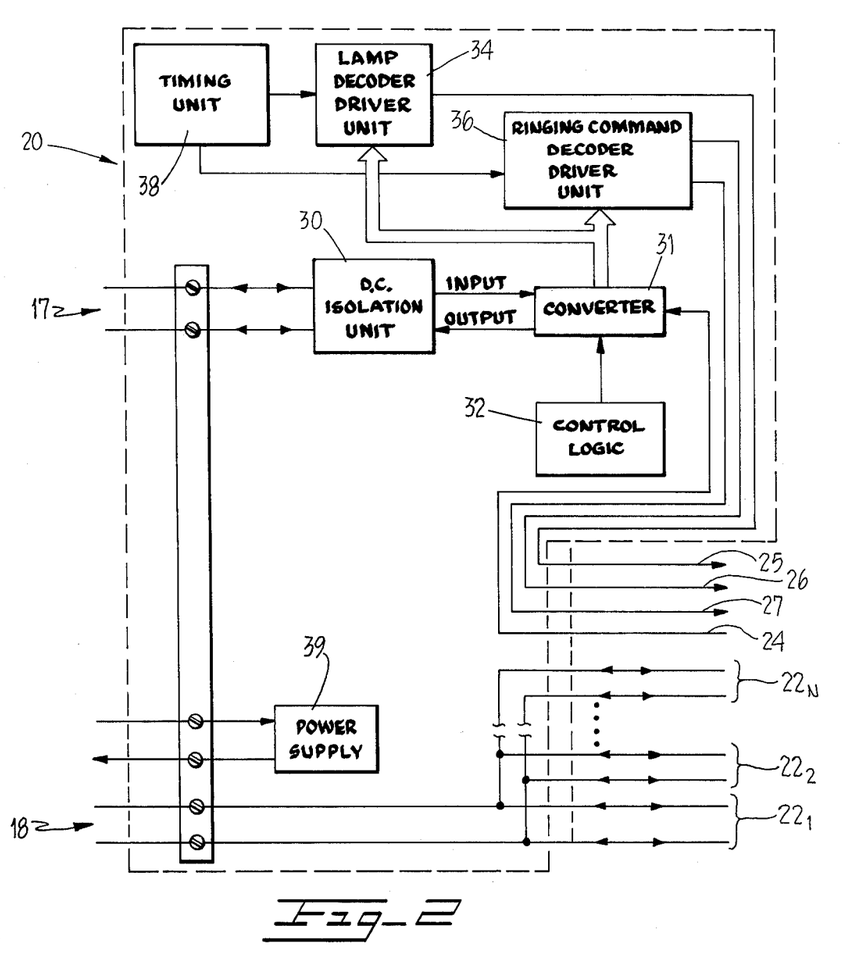
FIG. 2 is a simplified block diagram of the invention.

With reference to FIG. 2, conductor bus 16 includes a plurality of pairs of voice frequency conductors $22_i$ corresponding in number to the number of lines available to key telephone instrument 10 (or the number of line selector push buttons 12), each pair $22_i$ being coupled in parallel to voice frequency conductor pair 18, which in turn is coupled to electronic branch exchange 15; a data bus 24 coupled to pushbutton switches 12 and 13 of line selector unit 11 for supplying button status information signals to the key telephone adapter 20; and a group of conductors for providing activating signals for the line status indicators of key telephone instrument 10, the group including a conductor bus 25 for furnishing lamp actuation signals, a conductor 26 for furnishing ringing signals for the bell and a conductor 27 for providing buzzer actuation signals for the buzzer.

Data conductor pair 17 is coupled via a DC isolation unit 30 to the serial data input/output port of a converter 31 described below. The parallel data input of converter 31 comprises the button status signals furnished on conductor bus 24; the parallel data output terminals of converter 31 are coupled to a lamp decoder/driver unit 34 and a ringing command decoder/driver unit 36. Units 34 and 36 provide timed line status indicator actuation signals on conductors 25–27 for operating the line status indicators (e.g. the lamps, bell and buzzer) under control of a timing unit 38.

A power supply 39 provides DC voltages of appropriate levels for powering the various units of key telephone adapter 20.

General operation of key telephone adapter 20 proceeds as follows. Incoming serial data characters are isolated in unit 30 and converted to parallel data characters in converter unit 31. If the input serial character comprises a special polling character (described below), the line status signals on conductor bus 24 are converted by converter unit 31 to a serial data output character and coupled via DC isolation unit 30 to the electronic branch exchange 15 via data conductor pair 17. If the serial input character comprises one of several line status indicator commands, the character is converted by converter unit 31 into one or more parallel command signals which are used to control lamp decoder/driver unit 34 and ringing command decoder/driver unit 36 in conjunction with timing unit 38. The operating signals generated by unit 34, 36 are then applied to the line status indicators via conductors 25–27 and used to control operation of the bell, buzzer and lamps in key telephone instrument 10.

FIGS. 3 and 5A–5E illustrate the preferred embodiment in block diagram and circuit schematic form, respectively. In FIGS. 5A–5E, the voltages +V are all five volts D.C. Special voltages are expressly noted. Omitted from FIGS. 5A–5E are those circuit components comprising the power supply, the design of which is within the skill of the ordinary routineer.

With reference to FIGS. 3 and 5A–5F, serial input data on data conductor pair 17 is isolated by a pair of conventional photo-isolaters 41, 42 and coupled via a serial input gate 43, which is normally enabled by a control logic circuit 44, to the serial data input of a universal asynchronous receiver transmitter 45 (hereinafter UART 45). Serial data characters are output from UART 45 via a serial output latch 46, also controlled by control logic circuit 44, and photo-isolaters 41, 42 to data conductor pair 17.

UART 45 is a conventional unit, preferably a type AY-5-1013 unit available from General Instruments Corporation and is operated under control of a 230.4 KHZ clock generated by a 1.38 MHZ oscillator circuit 47 and a conventional divide-by-6 divider circuit 48. The clock provided by divider unit 48 is coupled to both the clock input and the data strobe (hereinafter DS) input of UART 45.

Line status signals on conductors 24 are input to a button status encoder and change detector circuit 50 which provides 5 bit parallel input signals to the parallel input terminals of UART 45 and a status change signal to control logic circuit 44, the latter signal occurring whenever the configuration of line selector pushbuttons 12 or hold pushbutton 13 is changed.

Figure 4A:
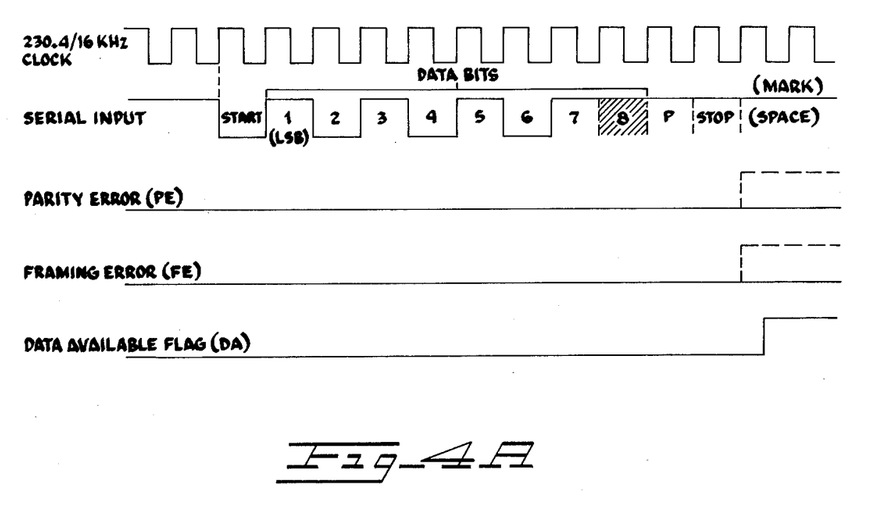
FIGS. 4A and B are serial data timing diagrams.
Figure 4B:
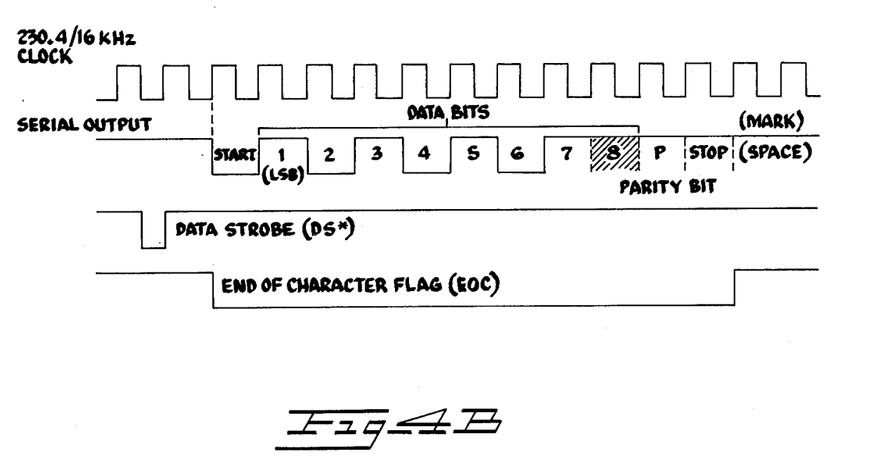
Figures 5A, 5F:
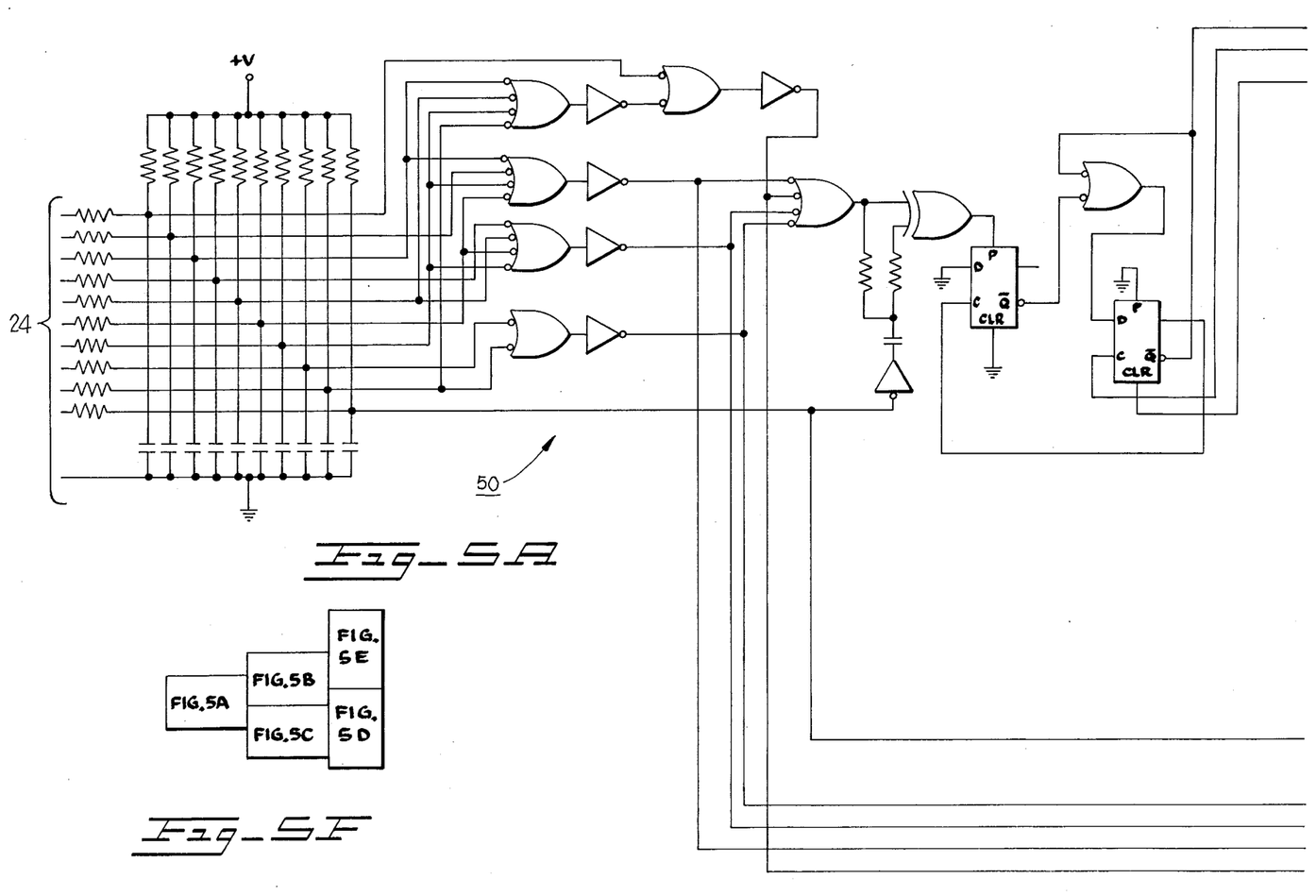
Figure 5B:
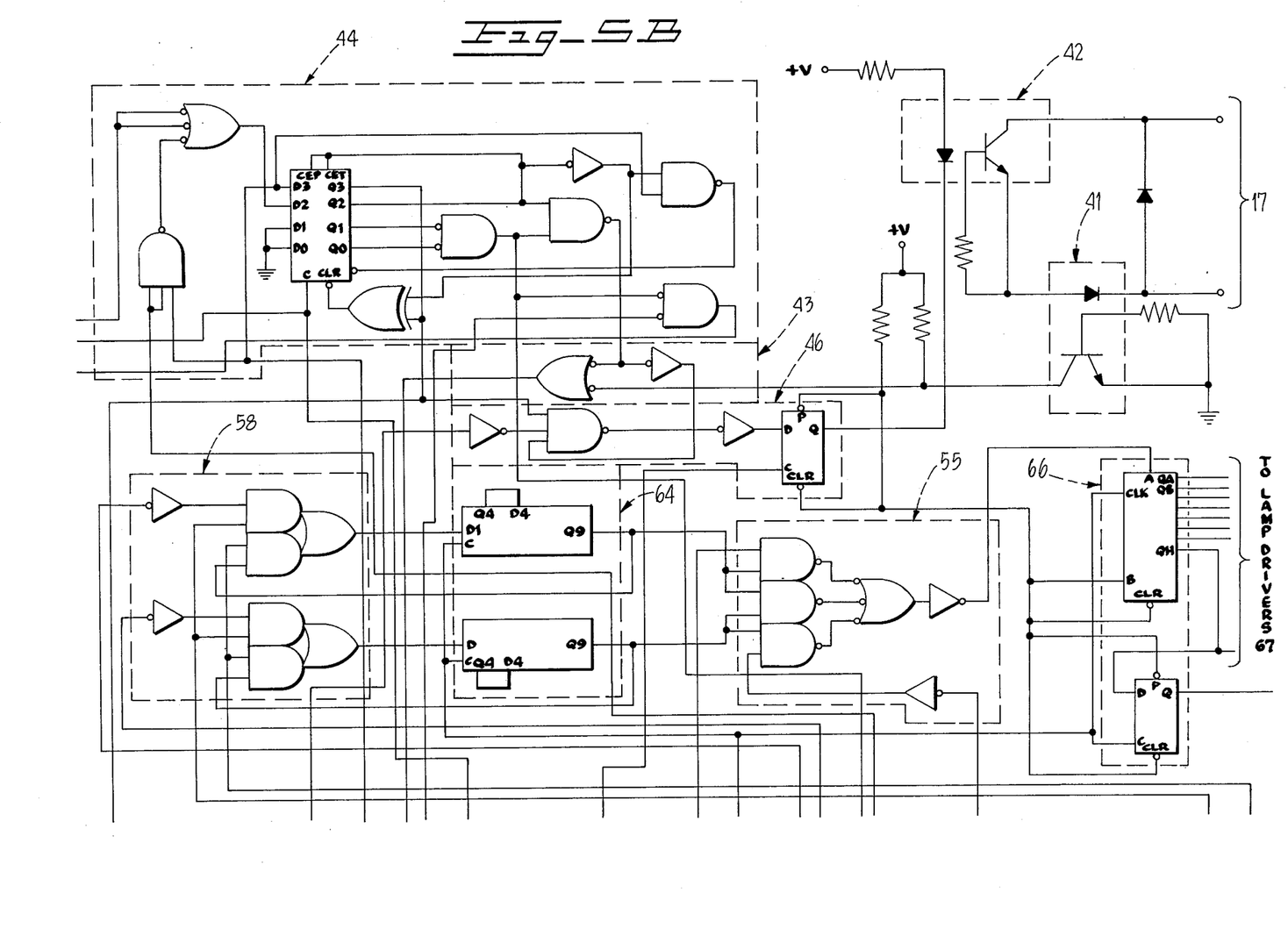
Figure 5D:
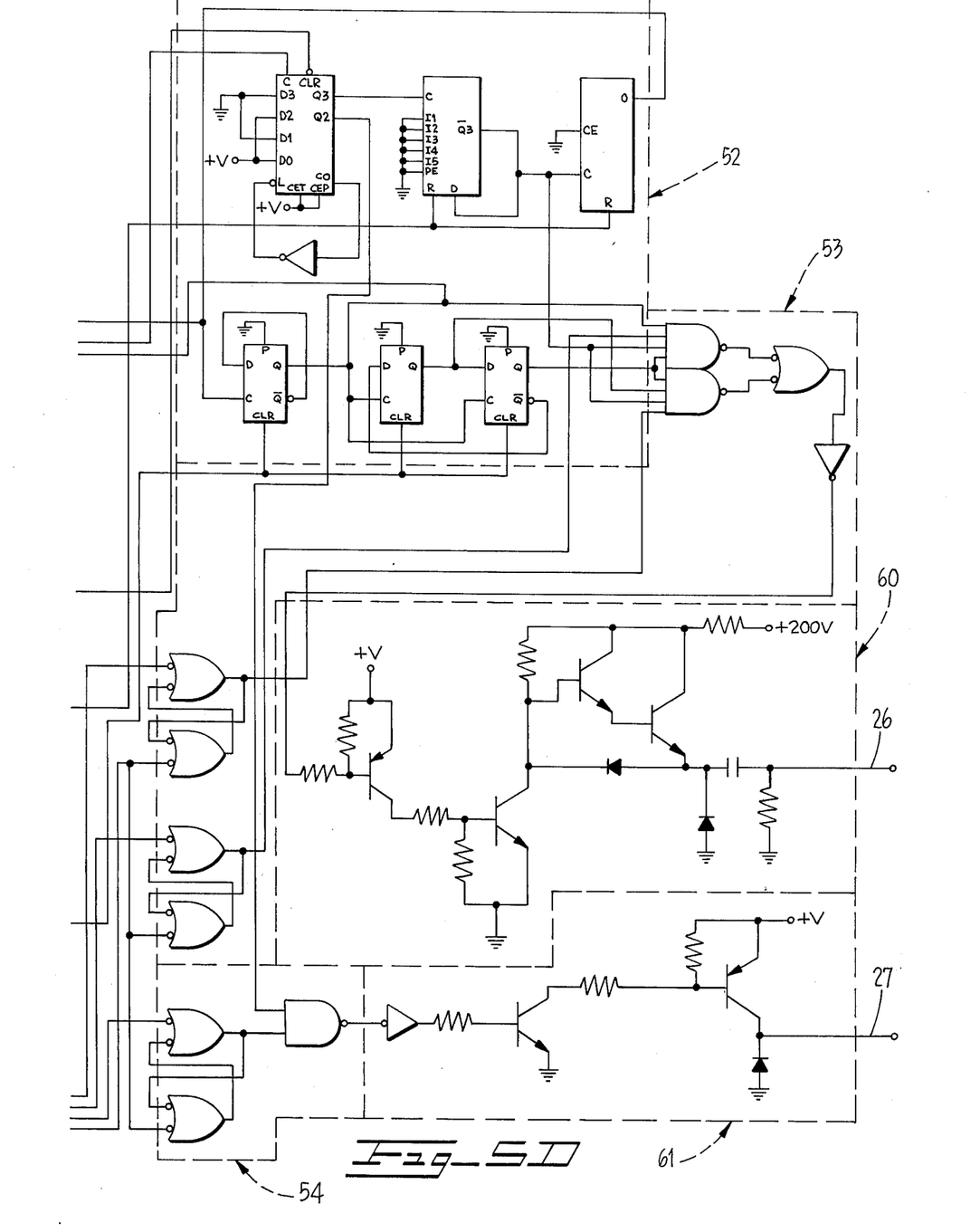
Figure 5E:
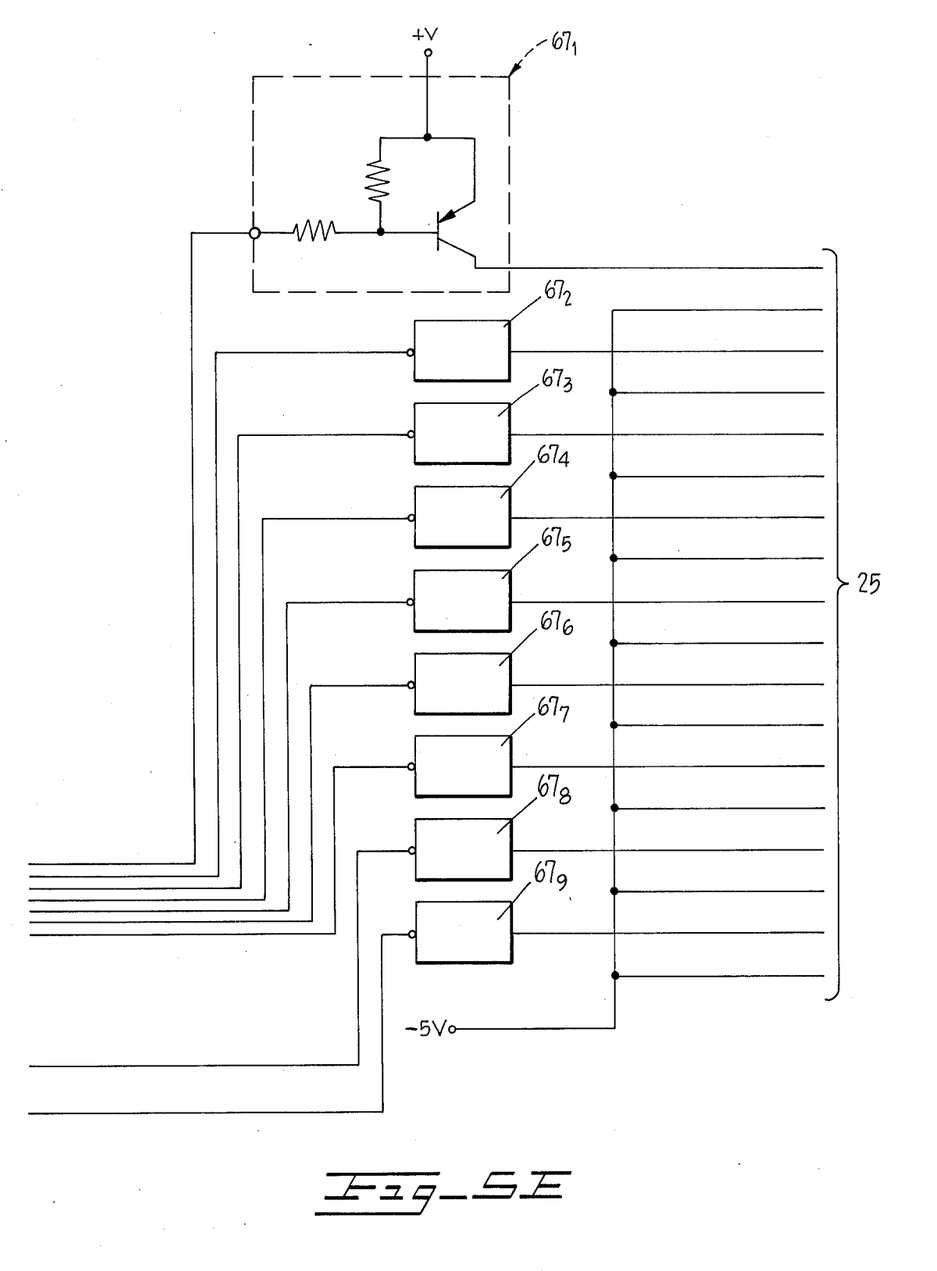
Figure 5I:
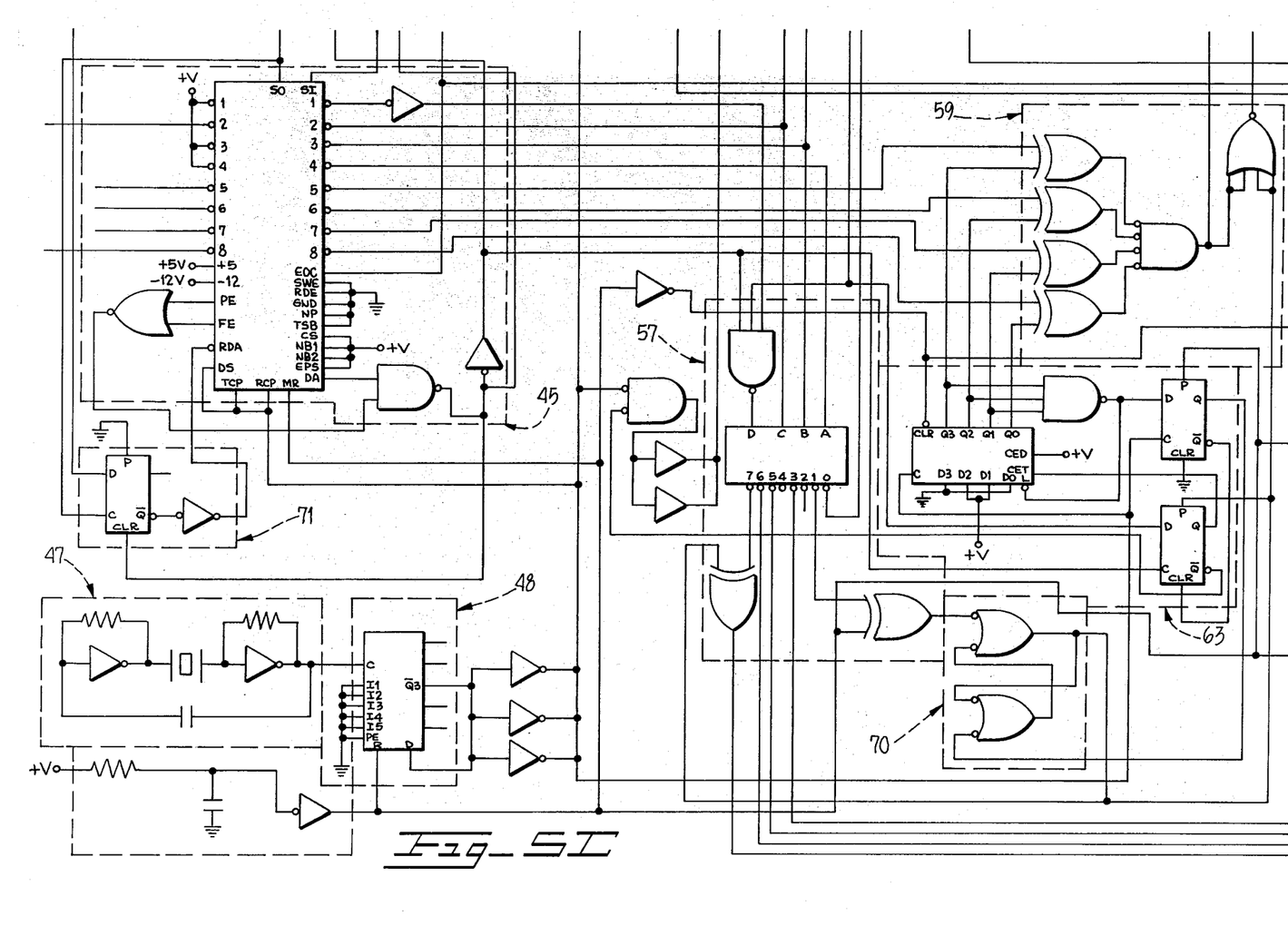

FIGS. 4A and B illustrate the serial input and serial output timing, respectively, for UART 45. UART 45 accepts new input commands, including a polling command, in serial format and converts these commands to eight bit parallel format. New line selector unit data from circuit 50 in 5-bit parallel format is also converted to serial format and transmitted to the electronic branch exchange 15. With reference to FIG. 4A, when a start pulse (mark-to-space transition) is detected, the next 8 bits received in serial form are data; the next bit is a parity bit to verify data integrity; and the last bit is a stop bit. If a parity error is detected, or a framing error is detected, the UART data available flag (DA) is inhibited. With no errors, DA is generated and the 8 data bits received by UART 45 are decoded. With reference to FIG. 4B, when a 5-bit word in parallel form is available at the parallel data input to UART 45, a UART data strobe signal (DS) will load the data and output a start bit, 8 data bits, a parity bit, and a stop bit in serial format. The end of character flag (EOC) is automatically produced by UART 45 during serial data output.

Figure 3:
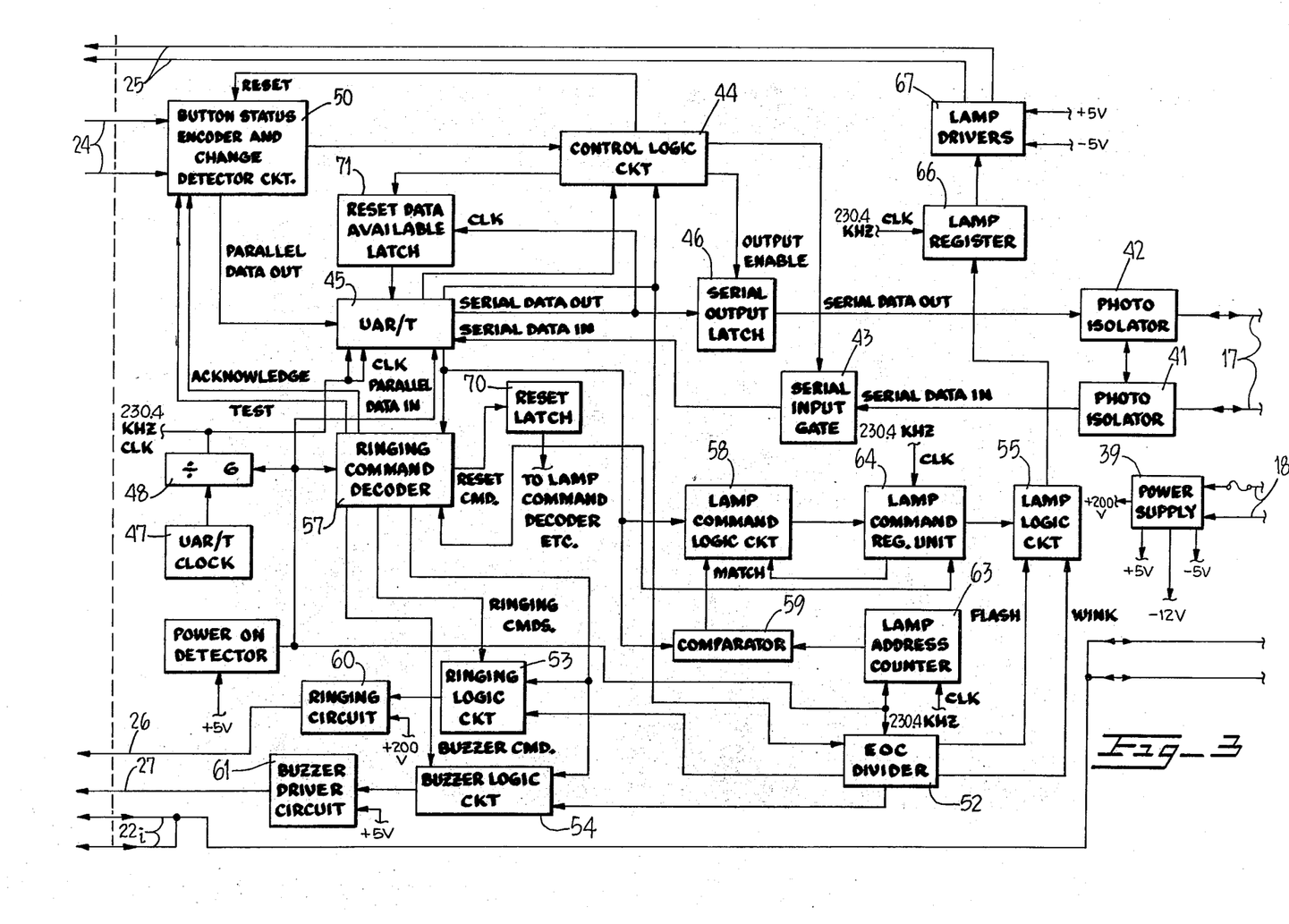
FIG. 3 is a block diagram illustrating the preferred embodiment of the invention.

The EOC signal is coupled to control logic circuit 44 as a counter incrementing reference and is also coupled to a divider circuit 52 as a timing reference signal for a ringing logic circuit 53, a buzzer logic circuit 54 and a lamp logic circuit 55, all described below.

The 8-bit parallel data output terminals of UART 45 are selectively applied to a ringing command decoder circuit 57, a lamp command logic circuit 58, and a comparator circuit 59. Ringing command decoder circuit 57 decodes the signals input thereto into ringing commands, which are coupled to ringing logic circuit 53, and buzzer commands, which are coupled to buzzer logic circuit 54. Ringing command decoder 57 also generates an off command for circuits 53, 54.

Ringing logic circuit 53 controls the operation of a ringing circuit 60, the output of which is coupled via conductor 26 to the bell in key telephone instrument 10. Buzzer logic cicuit 54 controls buzzer driver circuit 61, the output of which is coupled via conductor 27 to the buzzer in key telephone instrument 10.

The 8-bit data output terminals of UART 45 are also selectively applied to lamp command logic circuit 58 and comparator 59. As described more fully below, the lamp command logic circuit, comparator 59, a scale-of-9 lamp address counter 63, a lamp command register unit 64, lamp logic circuit 55, and a lamp register unit 66 selectively control the actuation of a plurality of individual lamp drivers 67 in accordance with a 2-bit lamp command and a 4-bit lamp address. The outputs of the lamp drivers 67 are coupled individually via bus 25 to the individual lamps in key telephone instrument 10 and control the actuation thereof in accordance with the lamp commands.

In the preferred embodiment, the following commands are used.

| FUNCTION | | B1* | C A B2* | D B B3* | E B4* | B5* | B6* | B7* | B8* |
|---|---|---|---|---|---|---|---|---|---|
| Lamp Commands: | Lamp Off | 0 | 0 | 0 | 0 | N | N | N | N |
| (NNNN = Lamp | Wink | 0 | 0 | 1 | 0 | N | N | N | N |
| Address) | Flash | 0 | 1 | 0 | 0 | N | N | N | N |
| | Lamp On | 0 | 1 | 1 | 0 | N | N | N | N |
| Ringing Commands: | Ringing Off | 1 | 0 | 0 | 0 | 0 | 0 | 0 | 0 |
| | Buzzer | 1 | 0 | 0 | 1 | 0 | 0 | 0 | 0 |
| | Ring 2 | 1 | 0 | 1 | 0 | 0 | 0 | 0 | 0 |
| | Ring 1 | 1 | 1 | 0 | 0 | 0 | 0 | 0 | 0 |
| | Test | 1 | 1 | 0 | 1 | 0 | 0 | 0 | 0 |
| | Reset | 1 | 1 | 1 | 0 | 0 | 0 | 0 | 0 |
| Internal Polling Command | | 1 | 1 | 1 | 1 | 1 | 1 | 1 | 1 |

As is evident from the above table, there are four lamp commands, six ringing commands and a special input command termed a polling command which is interpreted by the key telephone adapter 20 as a request to determine whether a status change has occurred since the last polling command.

The generalized structure of a lamp command is as follows:

A zero in the most significant bit position (B1) signifies a general lamp command, while bits B2 and B3 specify the particular command. Bit B4 is not used and bits B5–B8 signify the lamp address. The lamp off command extinguishes the lamp, the lamp on command lights the lamp, the wink and flash commands specify modulation of the indicated lamp at a rate of approximately two (1.984) and 1.0 (0.992) HZ, respectively.

The generalized structure of a ringing command word is as follows:

A general ringing command is specified by a one in the most significant bit (B1) position. Bits B2–B4 specify the specific command and bits B5–B8 are all zeroes. The buzzer command enables the buzzer logic circuit 54 to couple a 119 HZ signal from EOC divider 52 to the buzzer driver circuit 61, which modulates a 5 volt DC level with the 119 HZ signal. The ring 1 and ring 2 commands enable the ringing logic circuit 53 to pass a single or double pulse at a rate of 19.84 HZ to the ringing circuit 60, which converts a 200 volt DC level to a 90 volt AC RMS signal for the key telephone instrument 10. The 119 HZ, 19.84 HZ and 0.992 HZ signals are all derived from the periodic EOC signal continuously generated by UART 45. A ringing off command clears ringing logic circuit 53 and buzzer logic circuit 54. A reset command clears ringing logic circuit 53 and buzzer logic circuit 54 and also resets a latch 70 which clears lamp command registers 64. The test command is used for test purposes only and causes the circuit 50 to simulate a status change condition which causes UART 45 to output a data word to the electronic branch exchange 15 when a subsequent polling command is received.

Figure 6:
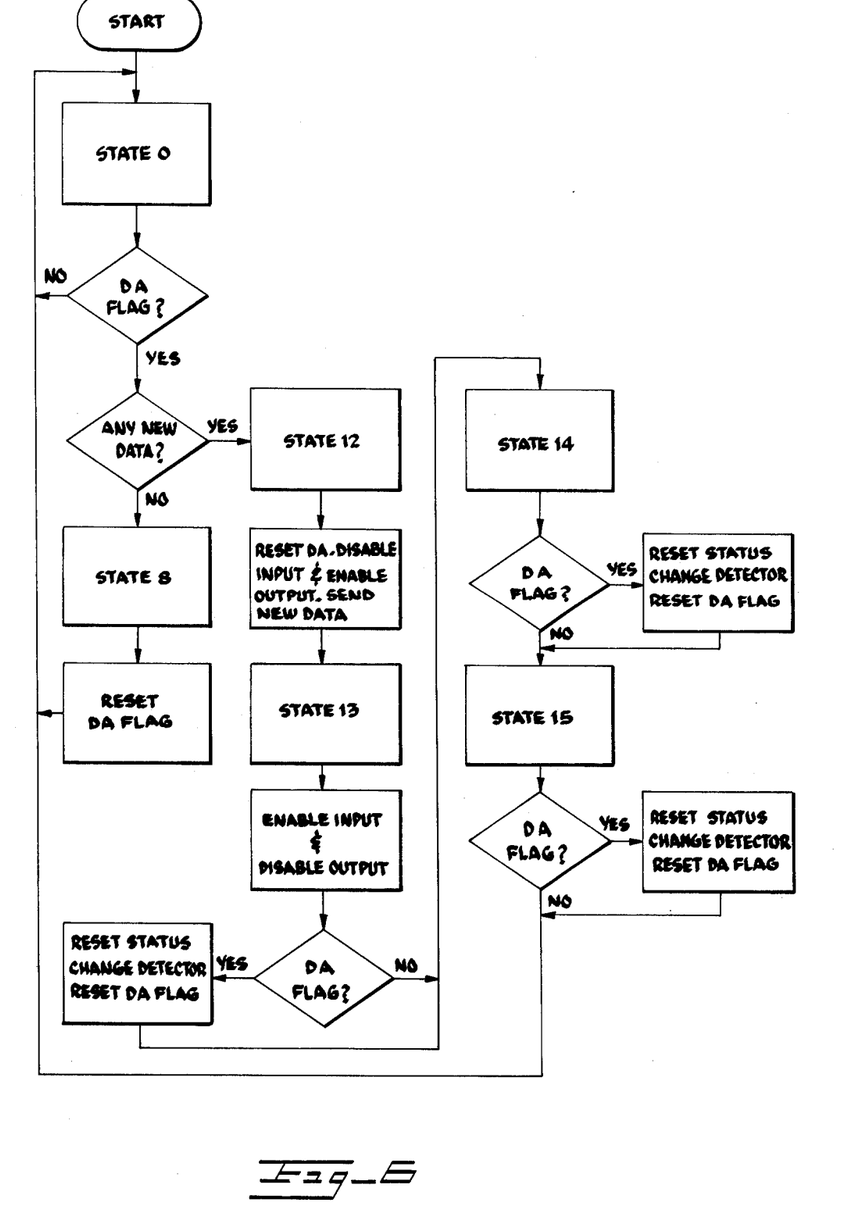
FIGS. 6 and 7 are flow charts illustrating system operation.

FIG. 6 is a flow chart illustrating the response of the system to the receipt of a polling command. When a polling command is received by the key telephone adapter 20, control logic circuit 44 is initially in the zero state. If no new data is available for transmission, the control logic circuit 44 is forced by circuit 50 to state 8. The next mark-to-space transition at the UART 45 serial output terminal clocks a reset data available latch 71, thereby generating a control signal RDA which is coupled to the UART 45 and clears the DA flag signal.

If one of the key telephone line switches 12 or 13 has changed since receipt of the last polling command, a status change control signal will be present thereby enabling circuit 44 to advance from state zero to state 12 when the next polling command is received. When circuit 44 advances to state 12, serial input gate 43 is disabled, serial output latch 46 is enabled, latch 71 is reset to clear the DA flag from UART 45 and the new key telephone instrument status word is transmitted via conductor pair 17 in serial format to the electronic branch exchange 15.

The EOC signal, which is generated by UART 45 after the new data word has been output by UART 45, clocks circuit 44 to state 13. In state 13, circuit 44 enables serial input gate 43 and disables serial output latch 46. Although UART 45 continues to generate a serial data output, this data is blocked from repeated transmission by disabled serial output latch 46. The repetitively appearing EOC pulses clock control logic circuit 44 through states 14, 15 and back to state zero. If an acknowledgement word is received from the electronic branch exchange during states 13, 14 or 15, the DA flag generated in response thereto causes control logic circuit 44 to reset the status change detector portion circuit 50. When this occurs, the DA flag is reset by latch 71 and control logic circuit 44 awaits a new command in states zero and eight. If the new data is not acknowledged, control logic circuit 44 will enable retransmission of the data via states 0, 12, 13, 14, 15 and 0 upon receipt of a subsequent polling command.

Figure 7:
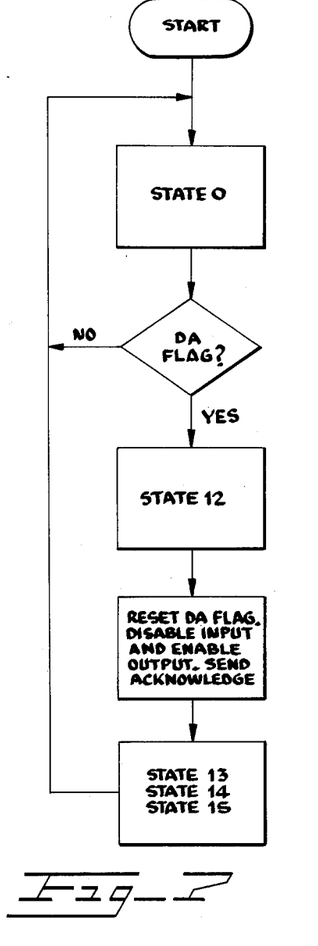

FIG. 7 illustrates the operation of key telephone adapter 20 in response to the receipt of a command other than a polling command. When such a command is received, control logic circuit 44 is initially in state zero. Ringing command decoder 57 generates a control signal, termed acknowledge, which is coupled to circuit 50 and overrides the status change detector portion of this circuit, which causes control logic circuit 44 to advance to state 12. In state 12, the DA flag is cleared, and serial input gate 43 is disabled and serial output latch 46 is enabled by control logic circuit 44. Thereafter, UART 45 transmits an acknowledgement word to the electronic branch exchange 15 via data conductor pair 17. The control logic circuit 44 next advances through state 13, 14 and 15 and returns to state 0.

If the new command is a ringing command, ringing command decoder 57 is enabled (B1 true, DA flag present, and control logic in state zero). If the buzzer command is decoded, buzzer logic circuit 54 is enabled, allowing a 119 HZ signal to pass to the buzzer driver circuit 61. The buzzer driver circuit 61 modulates a five VDC level signal with the 119 HZ signal. If the ring one or ring two commands are decoded, ringing logic circuit 53 is enabled, allowing a single or double pulses at 19.84 HZ to pass to the ringing circuit 60.

The ringing circuit 60 converts a 200 volt DC level to a 90 VAC RMS signal for the key telephone instrument 10. When a ringing off command is decoded, ringing logic circuit 53 and buzzer logic 54 are both cleared. These circuits are also cleared when the reset command is decoded which also clears the lamp command registers 64. If a test command is decoded, the status change detector portion of circuit 50 is set which causes UART 45 to output a data word to the electronic branch exchange 15 when the next polling command is received.

If the new command is a lamp command, ringing command decoder 57 is disabled (B1 false). The lamp address (bits B5-B8) is sent to comparator 59, and the lamp command (bit B2 and B3) is sent to lamp command logic circuit 58. Lamp address counter 63 is decremented from state 9 (1001) to state 1 (0001) and then resets automatically to state 9. When the lamp address specified at the input to comparator 59 matches the output of lamp address counter 63, comparator 59 enables lamp command logic circuit 58 so that the 2-bit lamp command is loaded into lamp command register unit 64 clocked by the 230.4 KHZ clock from divider unit 48. Lamp command register unit 64 comprises a pair of 9-bit serial shift registers clocked by the 230.4 KHZ clock supplied by divider 48.

After a new command has been loaded into lamp command register unit 64, the individual register outputs (refresh) are connected to the input, so that subsequent clock pulses recirculate the lamp command therein. The lamp command thus loaded is preserved until a new lamp command replaces it, a reset command is received, or power is interrupted to key telephone adapter 20.

The lamp command register 64 outputs are connected to lamp logic circuit 55 which performs the following operation for each lamp command stored in the lamp command registers 64:

a. if both bits (B2 and B3) are zero, the lamp state is zero (OFF).

b. if both bits are one, the lamp state is one (ON).

c. if B2 is one and B3 is zero, the lamp state is modulated by the 0.992 HZ flash rate (FLASH).

d. B2 is zero and B3 is one, the lamp state is modulated by the 1.984 HZ wink rate (WINK).

The lamp states are clocked in serial format from lamp logic circuit 55 into lamp register 66. Lamp register 66 is a 9-bit shift register which functions as a serial-to-parallel converter or demultiplexer, distributing the lamp states to the key telephone instrument lamps via lamp drivers 67 and conductors 25. The lamp drivers 67 supply a 10 volt DC voltage to the lamps for the on state.

Figure 8:
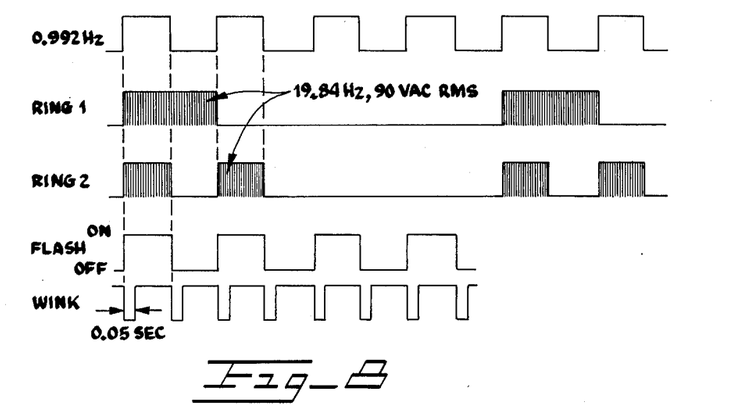
FIG. 8 is a waveform diagram illustrating various ringing and lamp illuminating operations.

FIG. 8 illustrates the timing of the RING ONE, RING TWO, FLASH and WINK operations relative to the 0.992 HZ timing signal generated by divider 52. As seen in this Fig., the RING ONE signal has an ON time of approximately 1 second (1.008), an off time of approximately 3 seconds (3.024) and a period of approximately 4 seconds (4.032); the RING TWO and FLASH signals have an ON time and an OFF time of approximately one-half second (0.504) and a period of approximately 1 second (1.008); and the WINK signal has an ON tme of 0.454 second, an OFF time of 0.05 second and a period of 0.504 second. The RING ONE signal is used to signify an incoming call from an outside line; RING TWO signifies an internal incoming call; FLASH signifies a ringing line; and WINK signifies a line on hold.

As will now be apparent the key telephone adapter 20 requires only two pairs of conductors (a voice pair and a data pair) to provide communication with the associated electronic branch exchange. Thus, when installing an electronic telephone switching system in a building or suite of offices no special sites need be selected and pre-wired for the key telephone instruments 10. If a key telephone instrument 10 is desired at a particular location, it is only necessary to connect a key telephone adapter 20 to the voice and data pair at the desired site, provide a step-down transformer 21, and connect the key telephone instrument 10 to the key telephone adapter 20. This provides unparalleled flexibility in the placement of the telephone handsets in a private branch exchange.

While the above provides a full and complete disclosure of the preferred embodiments of the invention, various modifications, alternate constructions and equivalents may be employed without departing from the true spirit and scope of the invention. Therefore the above description and illustrations should not be construed as limiting the scope of the invention which is defined by the appended claims.

What is claimed is:

1. An apparatus responsive to a predetermined polling command from an electronic branch exchange for converting signals representative of the status of each line of a line selector unit of a standard multi-line key telephone instrument to serial data signals for transfer to said electronic branch exchange via a pair of data signal conductors and for converting serial data command signals received from said branch exchange via said pair of data signal conductors to command signals specifying operation of a plurality of line status indicators in said key telephone instrument, said apparatus comprising:

input/output port means adapted to be coupled to said pair of data signal conductors and including D.C. isolation means;
   input terminal means adapted to be coupled to said line selector unit;
   output terminal means adapted to be coupled to said line status indicators;
   converting means having a serial data port coupled to said input/output port means, a parallel data input terminal means, and a parallel data output terminal means, said converting means including universal asynchronous receiver/transmitter means for converting serial data signals input thereto to parallel data signals appearing on said parallel data terminal means and means for converting parallel data signals input thereto to serial data signals appearing on said serial data port;
   encoder means coupled to said input terminal means and said converting means for furnishing said line selector unit signals to said parallel data input terminal;
   decoder means coupled to said output terminal means and said parallel data output terminal means of said converting means for furnishing said line status indicator command signals to said output terminal means;
   control means responsive to receipt of said predetermined polling command by said converting means for enabling said converting means to generate said serial data signals from said line selector unit signals and for enabling said serial data signals to be coupled to said input/output port means, and responsive to receipt of said data command signals for enabling said converting means to generate said parallel data signals from said incoming serial data signals appearing at said input/output port means and for enabling said decoding means to couple said command signals to said output terminal means,
   said encoder means including status change detector means for generating a control signal for conditioning said control means whenever said line selector unit signals are altered,
   said decoder means including a ringing command decoder/driver unit selectively responsive to a first group of said data command signals for generating a first group of said line status indicator command signals, and a lamp command decoder/driver unit selectively responsive to a second group of said data command signals for generating a second group of said line status indicator command signals,
   said ringing command decoder/driver unit comprising a ringing command decoder, a ringing logic circuit coupled to said ringing command decoder, and a ringing circuit coupled to said ringing logic circuit;
   first timing means for generating a first periodic waveform of a first frequency on a first terminal, said first terminal being coupled to said ringing logic circuit;
   said lamp command decoder/driver unit including a plurality of lamp driver circuits, means for storing said command signals from said second group in an ordered sequence with each said stored command signal being associated with a different one of said driver circuits, and means for sequentially enabling said plurality of lamp driver circuits in accordance with the corresponding stored command signal; and
   second timing means for generating a pair of periodic signals of different frequencies,
   said lamp command decoder/driver unit further including means for selectively applying said periodic signals to said sequential enabling means in order to modulate the actuation of individual ones of said plurality of lamp driver circuits.

2. The combination of claim 1 wherein said ringing command decoder/driver unit further includes a buzzer logic circuit coupled to said ringing command decoder and a buzzer driver circuit coupled to said buzzer logic circuit, and wherein said first timing means includes a means for generating a second periodic waveform of a second frequency on a second terminal, said second frequency being different from said first frequency, said second terminal being coupled to said buzzer logic circuit to modulate the actuation thereof.

* * * * *